Figure 1:
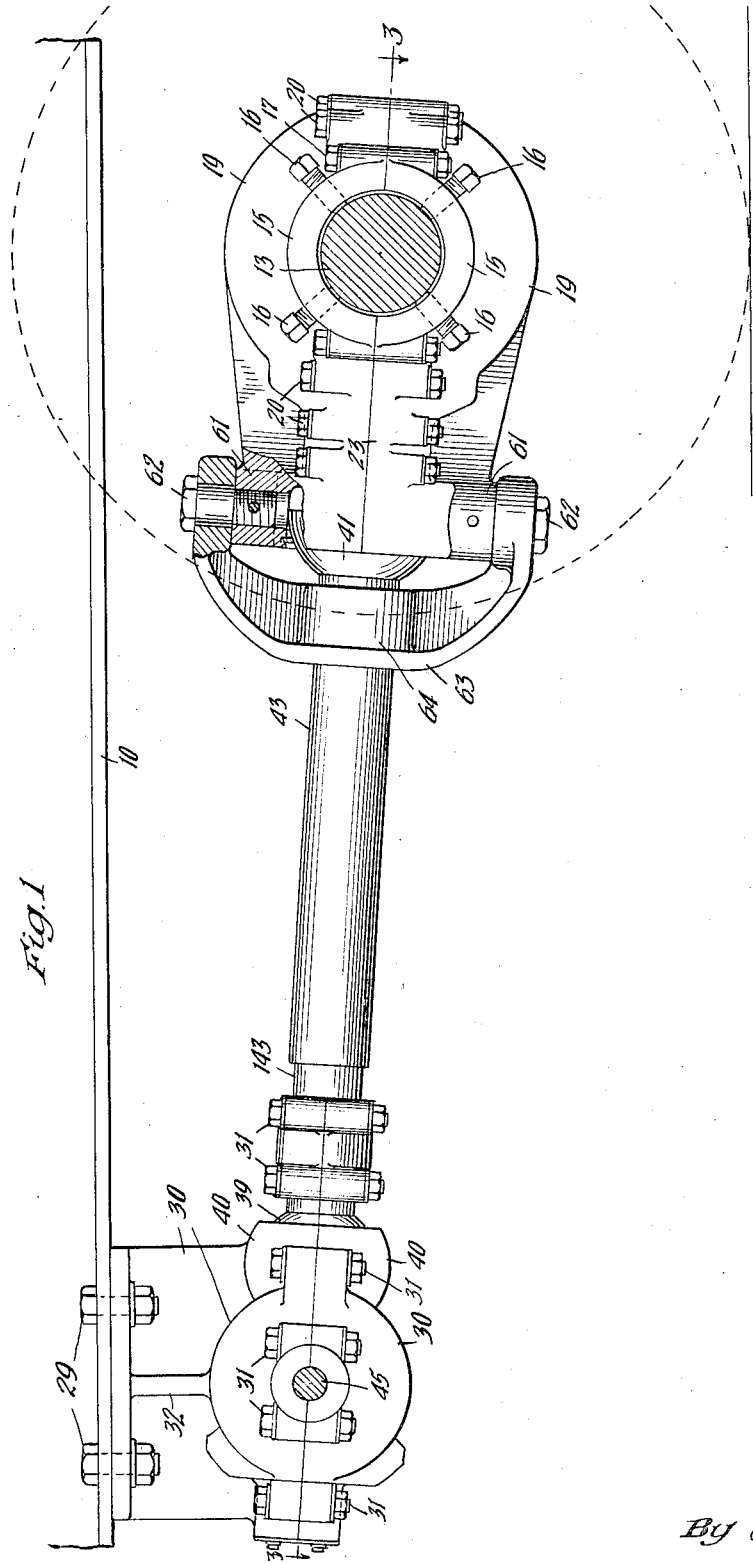

Dec. 24, 1935.  C. W. SPOHR  2,025,314

CAR AXLE DRIVING MECHANISM

Filed April 9, 1932   3 Sheets-Sheet 1

Inventor
Carl W. Spohr
By Joseph Harris
His Atty.

Dec. 24, 1935.       C. W. SPOHR       2,025,314
CAR AXLE DRIVING MECHANISM
Filed April 9, 1932       3 Sheets-Sheet 3

Inventor
Carl W. Spohr
By Joseph Harris
His Atty.

Patented Dec. 24, 1935

2,025,314

UNITED STATES PATENT OFFICE 2,025,314

CAR AXLE DRIVING MECHANISM

Carl W. Spohr, Chicago, Ill., assignor to Mechanical Refrigerated Car Company, Chicago, Ill., a corporation of Illinois Application April 9, 1932, Serial No. 604,217

5 Claims. (Cl. 105—118)

This invention relates to improvements in car axle driving mechanism, and more especially such a mechanism for operating a compressor for a mechanically refrigerated car, one example of which is shown in Reissue Patent No. 17,660 to Otto Luhr under date of May 13, 1930, and to which reference may be had for a clearer understanding of certain phases of this invention.

In the operation of compressors from a car axle, such as shown in said reissue patent, several horse power must normally be transmitted by the driving mechanism. Experience has shown that, in the operation of compressors as shown in said reissue patent, certain abnormal conditions sometimes occur which impose very heavy loads on the driving mechanism, as for instance, when the car is suddenly started or when started after the compressor refrigerating system has been idle for a considerable period of time. When a car is started suddenly, the inertia of the parts to be overcome is considerable and, when the car is started after the refrigerating system has been idle for some time, it sometimes happens that the refrigerant in the system may condense or liquefy in the compressor. When the latter situation arises, upon starting the compresser pistons, the latter are compelled to displace a liquid as distinguished from the normal operation of displacing a gaseous fluid, with the result that much difficulty has heretofore been experienced in maintaining the compressor drive against breakage due to such abnormal and excessive loads.

One object of this invention is to provide a car axle drive primarily, but not exclusively, designed for efficiently transmitting relatively heavy loads and capable of withstanding unusual or abnormal load conditions without danger of breakdown.

Heretofore, in axle drives using gearing and shafting for operating compressors fixed to the car body, it has been the common practice to employ a transversely extended bracket secured at one or both ends to the truck side frames and to mount part of the driving mechanism on such bracket and from the bracket and driving mechanism thereon, extend the necessary shafting to the compressor or other mechanism fixed to the car body. Such constructions are open to several objections, among them being the necessity of providing different styles of brackets for attachment to the different types of truck side frames; the extra weight involved where the bracket is run from one side frame to the other and expense of attachment to the side frame; and, in the case of brackets secured to one frame only, the extreme difficulty in making the same of sufficient strength and rigidity to prevent failure under abnormal load conditions.

Another object of this invention, therefore, is to provide a drive mechanism which entirely eliminates the use of any brackets attached to the truck side frames and to run the drive directly from the car axle to parts fixedly mounted on the car body, thereby reducing cost of application; adapting the drive for universal application to all types of trucks; and to obtain a more efficient transmission of the power.

A further object of the invention is to provide an axle drive of the type indicated which freely accommodates itself to every possible movement of the drive axle relative to the car body and its truck, both angularly as the truck turns on its king pin relative to the car body when passing over curved sections of track and/or all up and down movements of the axle with reference to the car body and/or its own truck.

Another object of the invention is to provide a drive of the character indicated, particularly adapted for actuating compressors, wherein means are incorporated in the drive to prevent breakage of the parts under an abnormal load condition.

Other objects of the invention will more clearly appear from the description and claims hereinafter following when considered in connection with the drawings.

Figure 2:
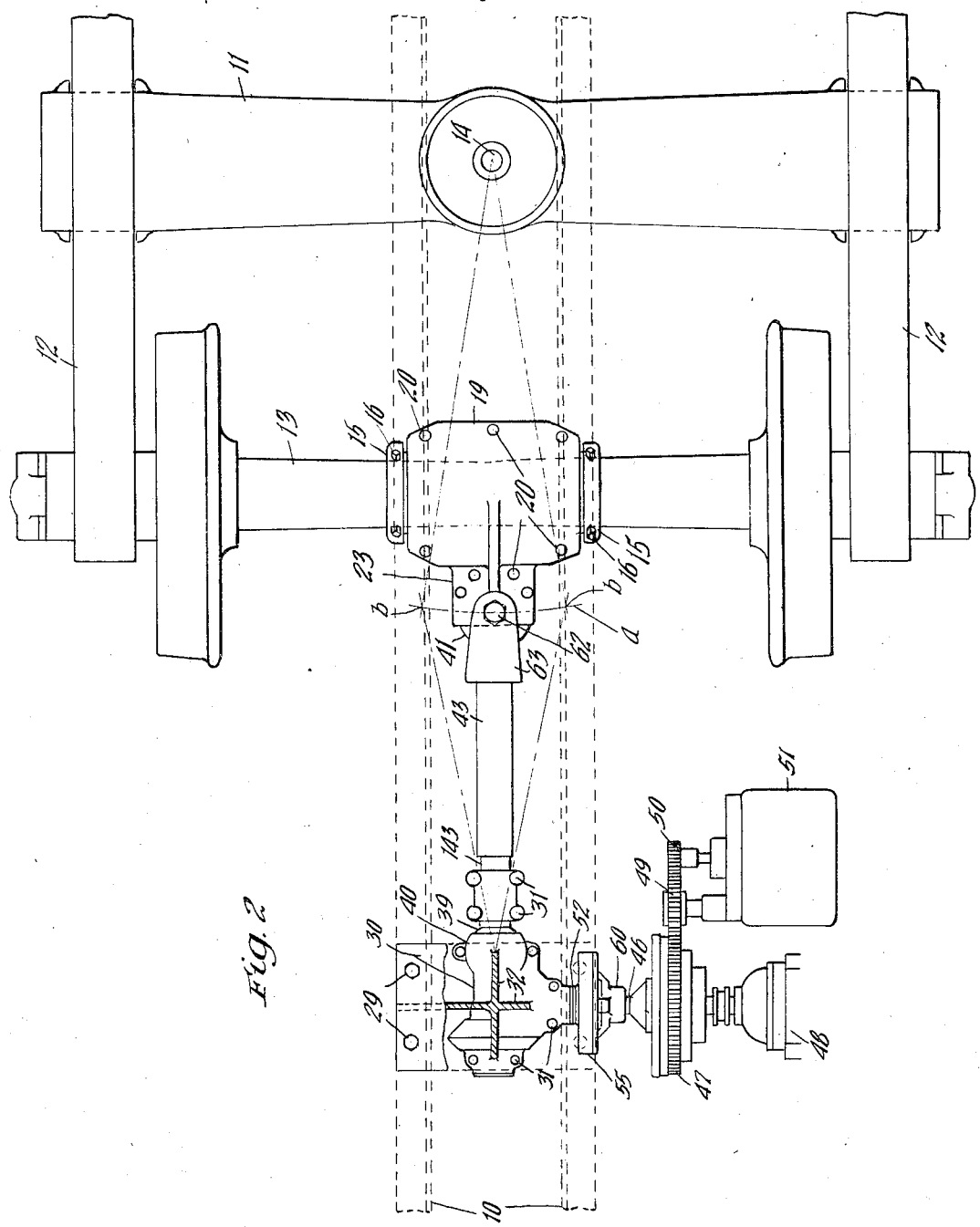
Figure 4:
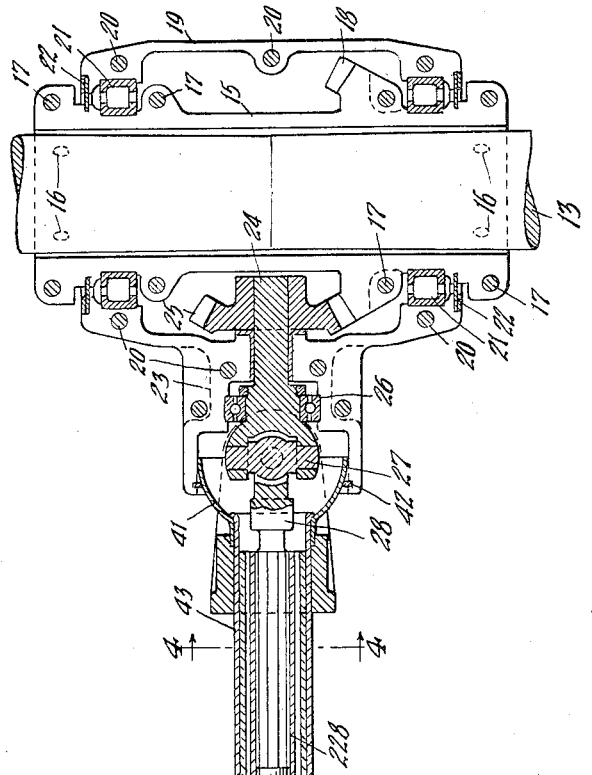
Figure 4:
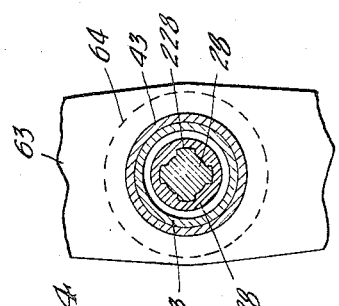
Figure 3:
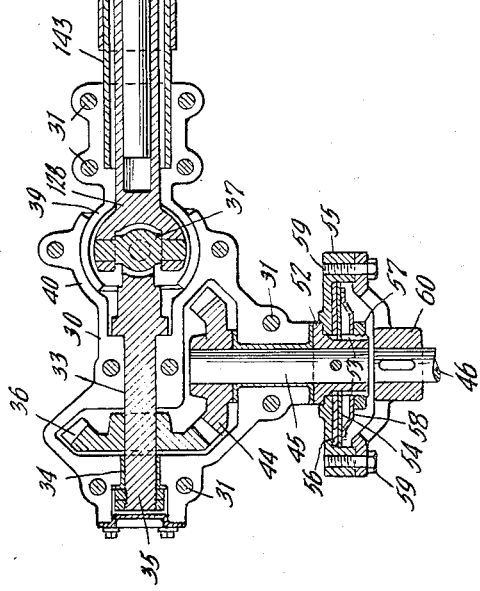

In the drawings forming a part hereof, Figure 1 is an elevational view of a portion of a car body showing the improved drive mechanism associated therewith, the driving car axle being indicated in section and one of its wheels by dotted lines. Figure 2 is a top plan view of a portion of the car truck, driving mechanism and portions of a compressor operated thereby, certain parts being broken away and other parts shown in section, and the usual center sills of the car indicated by dotted lines. Figure 3 is a sectional view corresponding substantially to the section line 3—3 of Figure 1. And Figure 4 is a vertical, sectional view corresponding to the line 4—4 of Figure 3.

In said drawings, the usual channel center sills of the car body are indicated at 10—10; the bolster of one of the trucks at 11; the two side frames of the truck at 12—12; and the inner axle of the truck at 13. As customary, the truck is pivotally connected to the car body to swivel about the king pin, the opening for which in the bolster is indicated at 14. As also customary, the truck will be such that the axles thereof are movable up and down relative to the side frames.

In carrying out the invention, the drive mechanism is preferably located in the longitudinal central plane of the car so as to keep to the minimum, the angular movements of the driving axle to each side of the normal position. To the axle 13 is secured a diametrically split sleeve 15, rigid connection to the axle being effected by any suitable means such as the set screws or bolts 16—16 of which a plurality may be used at each end of the sleeve. The two parts of the sleeve are clamped together by bolts 17—17 near the ends thereof. Integrally formed with the sleeve 15 is a bevel gear 18, which obviously will be rotated in unison with the axle.

Freely mounted on the sleeve 15 is a preferably diametrically split bearing member or housing 19, the parts of which are securely connected as by a plurality of bolts 20—20. To reduce the friction between the housing 19 and the axle and associated sleeve 15 rotatable therewith, sets of roller bearings 21—21 are preferably interposed between the sleeve 15 and housing 19, as indicated in Figure 3, the roller bearings being protected by suitable dust guards 22—22.

On the side nearest the compressor or other mechanism to be driven, the housing 19 is formed with a radially extending bearing sleeve 23 in which is rotatably journaled a shaft 24 having a bevel gear 25 secured thereto, said bevel gear meshing and cooperating with the axle bevel gear 18. Said shaft 24 has its axis in the longitudinal vertical central plane of the car, as evident from an inspection of Figures 2 and 3. At its outer end, the shaft 24 is preferably supported in an anti-friction ball bearing 26 and outwardly of the latter is forked so as to provide for a universal joint 27 connecting with the adjacent end of a shaft section 28.

Secured preferably to the lower flanges of the center sills, as by bolts 29—29, is another bearing housing 30 preferably in the form of two castings, bolted together as by bolts 31—31. To make the housing casting 30 of sufficient strength while at the same time reducing the weight to the minimum, the same will preferably be formed with cross webs, as indicated at 32 in Figure 2. Said bearing housing 30 provides two bearings 33 and 34 for a shaft 35 which, near one end thereof, has a bevel gear 36 secured thereto. In the normal position of the parts, the shaft 35 is alined with the shaft 24. At its end nearest the axle 13, the shaft 35 is forked so as to provide for a universal joint connection 37 with the adjacent end of a shaft section 128. The shaft sections 28 and 128 are telescoped, the former within the latter, the engaging sliding sections having longitudinal key and groove formations, as indicated at 228 so that rotation of the section 28 is positively transmitted to the section 128, while at the same time permitting extension of the shaft to compensate for necessary variations in the length of the shaft due to movements of the axle 13 with reference to the fixed bearing housing 30.

To protect the universal telescopic shaft from dirt and other foreign matter, the same is covered with a shield comprising, preferably, a split ball-shaped casting 39 at one end, working in a correspondingly formed spherical section 40 of the bearing housing 30. A similar but preferably sheet metal ball-shaped shield 41 is employed at the other end, the same working within a cylindrical opening formed in the extension 23 of the axle bearing housing, a dust ring being carried by the latter, as indicated at 42. The shield 41 is rigidly connected with an outer casing or sleeve 43 within which telescopically slides another sleeve 143 rigidly connected to the member 39, in this manner providing a closed shield for the shaft 28—128.

The bevel gear 36 of the driven shaft 33 meshes with another bevel gear 44 carried by a transversely extending shaft 45 suitably journaled in the bearing housing 30. Said shaft 45 is alined with a shaft 46 operative through a positive gear clutch 47 to actuate the piston of the compressor 48. The gear clutch 47 is adapted to be operatively and selectively engaged with the pinion 49, which in turn meshes with a driving gear 50 carried by the armature shaft of a motor 51. The last described features are to allow of selective operation of the compressor from the car axle when the car is in motion and from the electric motor 51 from an outside source of power when the car is stationary, all as more fully described in a co-pending application of said Otto Luhr, Serial No. 413,713, filed December 13, 1929, and to which reference may be had for a fuller disclosure of the details of the selective operating mechanism.

As hereinbefore described, it may sometimes happen that the refrigerant will condense or liquefy in the compressor when it has been lying idle, thus rendering it difficult to start up the compressor. In order to relieve the excessive load that would thereby be imposed on the axle driving mechanism, an overload slip friction clutch is preferably incorporated in the drive between the shafts 45 and 46, as shown in Figure 3. In the construction shown, a hub 52 is secured to the outer end of the shaft 45, the hub being longitudinally slotted, as indicated at 53 in which is keyed a friction plate 54 adapted for longitudinal movement relative to the shaft 45, as will be evident. Journalled on the hub 52 is a clutch element 55 preferably carrying a friction disc 56 on the inner side thereof, and rotatable in unison therewith, said disc 46 being adapted to cooperate with the other disc 54. The latter is held by an adjustable yielding spring pressure against the former through the intermediary of a nut 57 threaded on the hub 52 and a flexible spring plate 58. Secured to the clutch member 55 as by bolts 59 is a second clutch element 60 keyed or otherwise secured to the compressor drive shaft 46. As will be understood, the slip friction clutch will be set to transmit all normal loads but in the event of an excessive sudden overload, the discs 54 and 56 will slip relatively to each other, but with sufficient friction to gradually pick up the shaft 46 and get it to rotating at synchronous speed with the shaft 45.

Referring now more particularly to Figure 1, the axle bearing housing 19 is formed at the outer end of its projecting section 23 with upper and lower lugs 61—61 in which are threaded and held in retained position, pivot-forming heavy bolts 62, the axes of which extend in a vertical plane. Pivotally connected to said bolts 62 is a relatively heavy yoke 63 having a centrally located hollow cylindrical sleeve 64 encircling and fitting the casing member 43, as shown in Figure 3. With the yoke attachment 63—62, it is evident that the shaft 28—128 may flex or break joint to either side in a radial plane passing through the axis of the axle 13 but, the shaft 28—128 is prevented from flexing or breaking joint in a vertical plane, passing through the axes of the pivot bolts 62 but without interfering with the flexing or movement of the shaft 28—128, bearing housing 19 and axle 13, vertically up and down with reference to the shaft 35, carried by the fixed bearing housing 33. With this construction, it will be evident that even though the bearing housing 19 and associated parts therewithin is relatively free to rotate about the car axle 13, said housing 19 and its parts are prevented from falling down or getting out of alinement with the shaft 28—128, as viewed in elevation. By this arrangement, all necessity of employing any supporting bracket carried by the truck is avoided and a positive direct drive obtained between the axle and the shaft 35 carried in the fixed bearing housing 30. As previously indicated, the truck swings about the king pin center 14 so that the vertical axis of the universal joint 27 will move substantially in the arc a, shown in Figure 2, the extreme limits of movement to either side of the normal neutral position being indicated at b—b and to accommodate the resulting change in distance of said universal joint from the other universal joint 37, the telescopic shaft 28—128 will extend and contract, as will be obvious, and similarly such up and down movement of the axle 13 relative to the car body and/or its own truck as may occur in service will be accommodated by extension and contraction of the said shaft 28—128 but without any breaking of the joint, as viewed elevationally, between said shaft and the axle bearing housing 19 and without any change in the alinement of the several shafts and shaft sections 24—228, 128 and 33.

What is considered the best mode of carrying out the invention has been illustrated and described, but obviously various changes and modifications may be made without departing from the spirit of the invention. All such changes and modifications are contemplated that come within the scope of the claims appended hereto.

What is claimed is:

1. In a railway car having a body, a truck pivotally connected thereto, and a mechanism adapted to be driven, mounted on the car body, the combination with a bearing member mounted on one of the trucks and with respect to which the axle is free to rotate; of a second bearing member fixedly mounted on the car body and having a shaft journaled therein for actuating said mechanism; driving means between said axle and shaft including an extensible shaft having a universal joint near each end thereof between said two bearing members; and means preventing flexing between said extensible shaft and the first named bearing member about an axis extending parallel to the axis of the axle.

2. In a railway car having a body, a truck pivotally connected thereto, and a mechanism adapted to be driven, mounted on the car body, the combination with a bearing housing fixedly attached to the car; of driving means for said mechanism mounted in said housing and including a shaft extending lengthwise of the car; a second bearing housing mounted on one of the truck axles with the axle free to rotate therein; axle driven means in said second bearing housing including a shaft normally extending lengthwise of the car; an extensible shaft extending between and having a universal joint at each end connecting said two first named shafts respectively; and means for maintaining in alinement, as viewed elevationally, said extensible shaft and the bearing housing mounted on the axle.

3. In a railway car having a body, a truck pivotally connected thereto, and a mechanism adapted to be driven, mounted on the car body, the combination with a bearing housing fixedly attached to the car; of driving means for said mechanism mounted in said housing and including a shaft extending toward said truck; a second bearing housing mounted on one of said truck axles with the axle free to rotate therein; axle driven means in said second bearing housing including a shaft normally extending toward said first named shaft; a universally jointed extensible shaft extending between and connecting said two first named shafts; and means for maintaining the relative angular positions, as viewed elevationally, between said extensible shaft and the bearing housing mounted on the axle, said means comprising a sleeve on the extensible shaft pivotally connected to the bearing housing, the axis of the pivotal connection being located in a vertical plane.

4. In a car axle driving mechanism, the combination with a housing supported on the axle and freely rotatable relatively thereto; of a driven shaft journaled in a fixed bearing carried by the car body; a universally jointed extensible shaft operatively connected at one end to said first named shaft and at its other end to the axle within said housing; and means including a yoke encircling said extensible shaft, said yoke having pivotal connection with said axle housing, the axis of the pivotal connection being disposed in a vertical plane.

5. In a railway car having a body, a truck pivotally connected thereto and a mechanism adapted to be driven, fixedly mounted on the car body, the combination with a bearing member mounted on one of the trucks and with respect to which the axle is free to rotate; of a second bearing member fixedly mounted on the car body and having a shaft journaled therein for actuating said mechanism; driving means between said axle and shaft including a universally jointed extensible shaft between said two bearing members; and an enclosing casing for said extensible shaft, said casing being universally adjustably attached at its ends to said bearing members and including telescoped sections.

CARL W. SPOHR.